(12) United States Patent
Oz et al.

(10) Patent No.: US 7,395,321 B1
(45) Date of Patent: Jul. 1, 2008

(54) METHOD AND SYSTEM FOR PRIORITIZED BIT RATE CONVERSION

(75) Inventors: Ran Oz, Modiin (IL); Nery Strasman, Ramat Gan (IL); Amir Leventer, Nfar Saba (IL); Mark Lutsker, Jerusalem (IL); Lior Assouline, Zihron Yaakon (IL); Amit Hildeshaim, Holon-Israel (IL)

(73) Assignee: Bigband Networks, Inc., Redwood City, CA (US)

( * ) Notice: Subject to any disclaimer, the term of this patent is extended or adjusted under 35 U.S.C. 154(b) by 0 days.

(21) Appl. No.: 11/151,477

(22) Filed: Jun. 13, 2005

Related U.S. Application Data

(63) Continuation of application No. 09/870,069, filed on May 29, 2001, now Pat. No. 7,058,087.

(51) Int. Cl.
*H04J 1/00* (2006.01)
*G06F 15/16* (2006.01)

(52) U.S. Cl. ............... 709/220; 709/207; 709/225; 370/468; 375/240

(58) Field of Classification Search ............... 709/220, 709/224, 228, 226, 231, 236, 207, 225; 370/468, 370/486; 348/405.1; 375/240
See application file for complete search history.

(56) References Cited

U.S. PATENT DOCUMENTS

| | | | |
|---|---|---|---|
| 5,506,844 A | | 4/1996 | Rao |
| 5,677,812 A | | 10/1997 | Cha |
| 5,682,195 A | | 10/1997 | Hendricks et al. |
| 5,828,848 A | * | 10/1998 | MacCormack et al. ...... 709/247 |
| 5,862,140 A | | 1/1999 | Shen et al. |
| 5,875,304 A | * | 2/1999 | Winter et al. ............... 709/231 |
| 5,909,548 A | * | 6/1999 | Klein et al. ................. 709/217 |
| 5,956,088 A | | 9/1999 | Shen et al. |
| 5,974,235 A | * | 10/1999 | Nunally et al. ............... 709/202 |
| 6,038,256 A | * | 3/2000 | Linzer et al. ........... 375/240.12 |
| 6,052,384 A | | 4/2000 | Huang et al. |
| 6,124,878 A | | 9/2000 | Adams et al. |
| 6,192,083 B1 | | 2/2001 | Linzer et al. |

(Continued)

OTHER PUBLICATIONS

Dr. Manfred Kuhn and Dr. Jochen Antkowiak, "Statistical Multiplex—what does it mean for DVB-T?" *Reprint from FKT Fachzeitschrift fur Fernsehen, Film und elektronische Medien*, Apr. 2000 (pp. 1-13).

*Primary Examiner*—Khanh Dinh

(57) ABSTRACT

The invention provides a system and a method for providing a multiplexed sequence, the multiplexed sequence including at least one sequence of basic media data units/modified basic media data units, the system and method are responsive to at least one characteristics (such as quality, quality degradation, compression level and the like, a combination of at least two of the characteristics) of at least of some of the basic media data units. The invention provides a method for generating a multiplexed sequence, the method including the steps of: receiving at least one basic media data unit sequence; determining a modification priority of a plurality of received basic media data units belonging to the at least one basic media data unit sequence; selecting basic media data units to be modified, in response to the modification priority; modifying each of the selected basic media data units; wherein a modified selected basic media data unit is smaller than the corresponding selected basic media data unit; and multiplexing the modified selected basic media data units and non-selected basic media data units to provide the multiplexed sequence.

49 Claims, 6 Drawing Sheets

U.S. PATENT DOCUMENTS

| | | |
|---|---|---|
| 6,259,733 B1 | 7/2001 | Kaye et al. |
| 6,377,782 B1 | 4/2002 | Bishop et al. |
| 6,377,998 B2 | 4/2002 | Noll et al. |
| 6,393,481 B1 * | 5/2002 | Deo et al. ................ 709/224 |
| 6,400,996 B1 * | 6/2002 | Hoffberg et al. ............. 700/83 |
| 6,499,060 B1 * | 12/2002 | Wang et al. ................ 709/231 |
| 6,640,145 B2 * | 10/2003 | Hoffberg et al. ............. 700/83 |
| 6,674,804 B1 | 1/2004 | Eshet et al. |
| 6,748,020 B1 | 6/2004 | Eifrig et al. |
| 6,813,270 B1 | 11/2004 | Oz et al. |
| 6,912,584 B2 * | 6/2005 | Wang et al. ................ 709/231 |
| 7,058,087 B1 * | 6/2006 | Oz et al. .................... 370/486 |

* cited by examiner

METHOD AND SYSTEM FOR PRIORITIZED BIT RATE CONVERSION

RELATED APPLICATIONS

The present application is related to, incorporates by reference and hereby claims the priority benefit of the following U.S. Patent Application, assigned to the assignee of the present cation: U.S. patent application Ser. No. 09/870,069, filed May 29, 2001 (now U.S. Pat. No. 7,058,087) entitled "Method And System For Prioritized Bit Rate Conversion."

FIELD OF THE INVENTION

The present invention relates to communication methods and systems in general, and to methods and systems for bit rate conversion of compressed media.

BACKGROUND OF THE INVENTION

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures, each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. There are three types of motion estimations—forward, backward and bi-directional. Macroblocks are the elementary unit for motion compensation and adaptive quantization. Each macroblock is associated with a quantization factor field, representative of the degree of quantization. A slice, including a plurality of macroblocks includes a slice header that has a quantization factor field that is associated to some of the macro blocks of the slice.

The compressed elementary streams usually include a sequence of three types of pictures. These types are known as I-picture, P-picture and B-picture. I-pictures use only intra-coding. P-pictures use forward prediction and usually also intra-coding. B-pictures use bi-directional coding (forward and/or backward prediction) and optionally also intra-coding. In a sequence of I, P, and B-pictures, each P-picture is encoded in view of a previous I-picture or P-picture. Each B-picture is coded using a previous I-picture of P-picture and/or a next I-picture or P-picture.

A recognizable picture can be reconstructed from an I-picture alone, but not from a B-picture alone. Only I-pictures and P-pictures can be anchor pictures that are used to predict another pictures. I-pictures allow for reconstructing a recognizable picture but offers only relatively moderate compression. B-pictures are usually much smaller than I-pictures. Each picture includes a picture header that includes a picture type indication, indicating whether the picture is an I, B or P picture.

Pictures are sometimes arranged in groups, that are referred to as Group Of Pictures (GOP). Usually, each GOP starts by an I-picture that is followed by B-pictures and P-pictures.

Elementary streams are packetized to produce PES packets. PES packets made up of elementary streams that form a program share a common time base. The PES packets may also include additional information. PES packets of distinct elementary streams can be arranged as either a Program Stream or a Transport Stream. At least one or more stream of PES packets having a common base time are usually combined to a Program Stream. A Transport Stream combines one or more programs with one or more independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams may be of either fixed or variable bit rate. Some programs of the Transport Stream are of a variable bit rate, if, for example, more bits are allocated to complex scenes, and less bits are allocated to more simple scenes.

Transport Streams are provided to a channel of a limited available bandwidth/storage space. The ISO/IEC 13818-1 specification defines a channel as a digital medium that stores or transports a Transport or a Program Stream. The aggregate bandwidth of all the components of the Transport Stream must not exceed, at any time, the available bandwidth of the channel.

Various lossy and lossless techniques are implemented to adapt the aggregate bandwidth of the programs of a Transport Stream to the available bandwidth of a channel. U.S. Pat. Nos. 6,038,256 and 6,192,083 of Linzer et al, U.S. Pat. Nos. 5,862, 140 and 5,956,088 of Shen et al and U.S. Pat. No. 5,877,812 of Krause et al, describe some of these prior art methods. Lossless techniques, such as statistical multiplexing, do not require further compressing of media pictures. Lossless techniques also include delaying or advancing a transmission of transport packets. Lossy techniques involve additional compression, and are usually implemented whenever the appliance of lossless techniques is not feasible or does not provide sufficient results. The further compression usually results in visual quality degradation.

Some prior art methods base their compression decisions upon a complexity of a scene. A disadvantage of these prior art methods is that they are at most adapted to perform a first modification (such as compression) of a media stream and are not suited to perform additional modifications (such as recompression) of a media stream. Another disadvantage of some prior art methods is that these methods contribute to a quality fluctuation along a stream.

Some prior art systems, such as Rhode & Schwartz digital video quality analyzer DVQ and Tektronix quality of service monitor PQM300 allow for measuring the quality of a video picture. Each DVQ is configured to measure the quality of one picture at a time. Measuring the quality of multiple programs within a transport stream requires a plurality of DVQ, as illustrated in the article "Statistical multiplex—what does it mean for DVB-T?" by Dr. Kuhn and Dr, Antkowiak, FKT Fachezeitschrift fur Ferensehen, Film und elektronische Medien April 2000, reprinted in http://www.rhode-schwarts.com. Multiple PQM300 are required to monitor a plurality of programs. As the DVQ and the PQM300 are relatively expensive, real time measurements of multiple programs within a single transport stream is very costly.

Another disadvantage of the mentioned above prior art methods is that they cannot be tuned/controlled/refined in view of external information such as video provider preferences, viewers preferences or additional information, such as quality or quality degradation statistics.

There is a need to provide a system and a method for providing a multiplexed sequence, the multiplexed sequence including at least one sequence of basic media data units and/or corresponding modified basic media data units, the system and method are responsive to at least one characteristic (such as quality, quality degradation, compression level and the like) of at least some of the basic media data units.

There is a need to provide a system and a method for providing a multiplexed sequence whereas the basic media data units of the multiplexed sequence are characterized by either an optimal quality, optimal quality degradation, optimal compression level, or a combination of said characteristics.

There is a need to provide a system and a method for adaptation of the aggregate bandwidth of the programs of a Transport Stream to the available bandwidth of a channel that provides programs with sufficient quality.

There is a need to provide a system and a method for adaptation of the aggregate bandwidth of the programs of a Transport Stream to the available bandwidth of a channel that are responsive to the quality degradation of each program.

There is a need to provide a system and a method for adaptation of the aggregate bandwidth of the programs of a Transport Stream to the available bandwidth of a channel that reduces compression level fluctuations and/or quality fluctuations in encoded video programs.

There is a need to provide a system and a method for applying lossy techniques for adaptation of the aggregate bandwidth/bit-rate of the programs of a Transport Stream to the available bandwidth of a channel in response to the compression level of basic media data units, such as macroblocks.

There is a need to provide a system and a method for adaptation of the aggregate bandwidth of the programs of a Transport Stream to the available bandwidth of a channel that provide an optimal Transport Stream, an optimal Transport Stream being characterized by optimal quality, compression level, quality degradation or a combination of said parameters.

SUMMARY OF THE PRESENT INVENTION

The invention provides a system and a method for providing a multiplexed sequence, the multiplexed sequence including at least one sequence of basic media data units/modified basic media data units, the system and method are responsive to at least one characteristic (such as quality, quality degradation, compression level and the like, or a combination of at least two of the characteristics) of at least of some of the basic media data units.

The invention provides a system and a method for providing a multiplexed sequence including at least one sequence of basic media data units, modified basic media data units and/or selected modified basic media data units, whereas the basic media data units of the multiplexed sequence are characterized by either an optimal quality, an optimal quality degradation, or an optimal compression level, or a combination of said characteristics.

The invention provides a system and a method for adaptation of the aggregate bandwidth of the programs of a Transport Stream to the available bandwidth of a channel that provides programs with sufficient quality. Conveniently, the system and method are responsive to the quality degradation of each program.

The invention provides a system and a method for adaptation of the aggregate bandwidth of the programs of a Transport Stream to the available bandwidth of a channel that reduces compression level fluctuations and/or quality fluctuations in encoded video programs.

The invention provides a system and a method for applying lossy techniques for adaptation of the aggregate bandwidth of the programs of a Transport Stream to the available bandwidth of a channel in response to the compression level of basic media data units, such as macroblocks.

The invention provides a system and a method for adaptation of the aggregate bandwidth of the programs of a Transport Stream to the available bandwidth of a channel that provides an optimal Transport Stream. An optimal Transport Stream being characterized by either optimal quality, compression level, quality degradation or a combination of said parameters.

The invention provides a system and a method for providing a multiplexed sequence including a plurality of basic media data units and a plurality of modified basic media data units. The modification is performed in response to a modification priority and optionally in response to a target size of the multiplexed sequence. The parameters can include quality, quality degradation, compression level, external modification information and the like.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
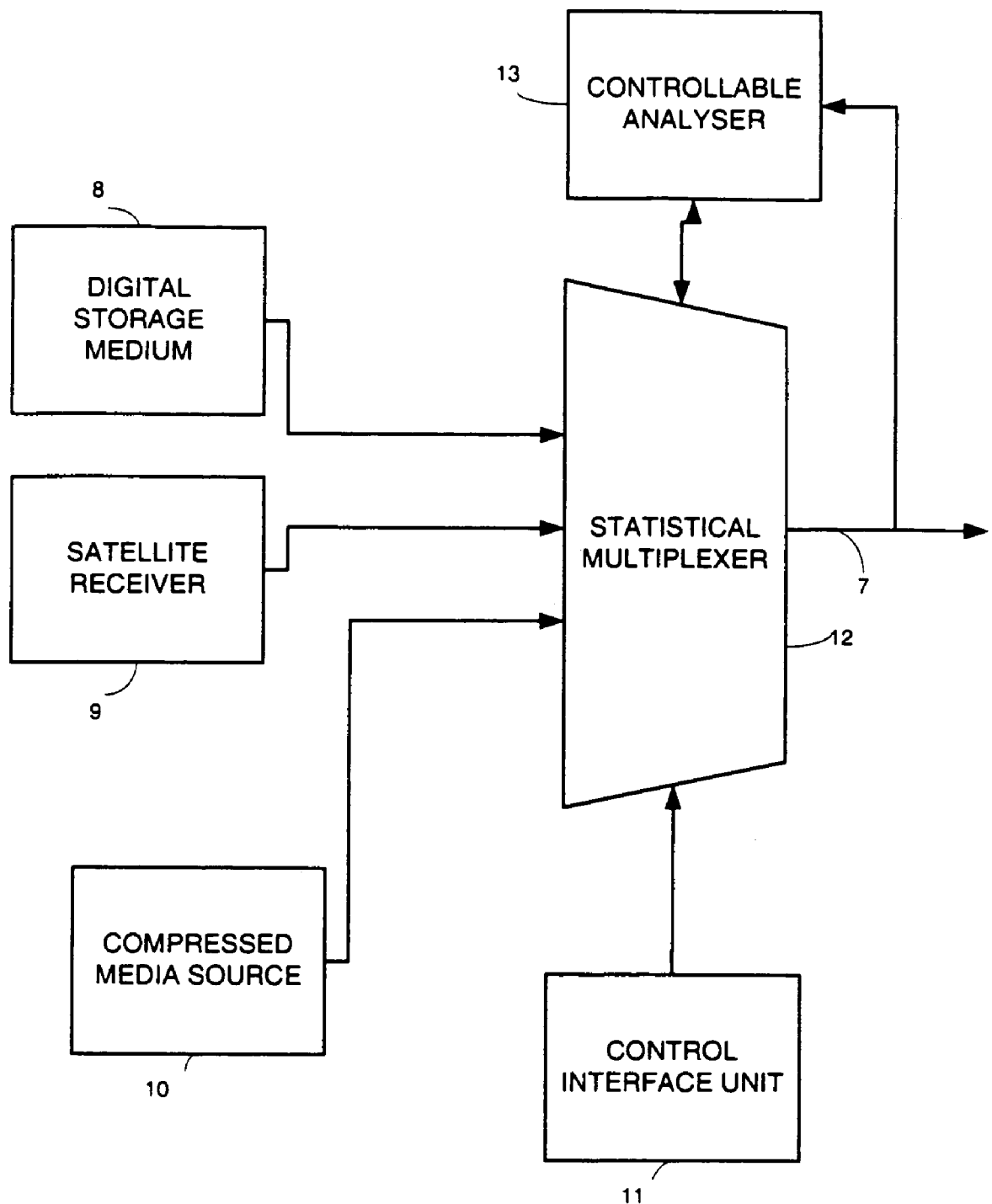
FIG. 1, is a schematic description of a statistical multiplexer and its environment, in accordance to a preferred embodiment of the invention.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a method for generating a multiplexed sequence including at least one basic media data unit sequence, the method including the steps of: (i) Receiving at least one basic media data unit sequence. (ii) Determining a modification priority of a plurality of basic media data units of the received at least one basic media data unit sequence. The plurality can include all the received basic media data units, but it is not necessary. (iii) Selecting basic media data units to be modified, in response to the modification priority. (iv) Modifying each of the selected basic media data units; wherein a modified selected basic media data unit is smaller than the corresponding selected basic media data unit. (v) Multiplexing the modified selected basic media data units and non-selected basic media data units to provide the multiplexed sequence.

The invention provides a method for generating and transmitting a multiplexed sequence over a communication channel, the communication channel has an available bandwidth, the multiplexed sequence including at least one basic media data unit sequence, the method including the steps of: (I) Receiving at least one basic media data unit sequence. (II) Determining a modification priority of a plurality of basic media data units of the received at least one basic media data unit sequence. (III) Selecting basic media data units to be modified, in response to the modification priority and to the available bandwidth. (IV) Modifying each of the selected basic media data units. (V) Providing the modified selected basic media data units and non-selected basic media data units to the communication channel.

The invention provides a statistical multiplexer for providing a multiplexed sequence including at least one basic media data sequence, the statistical multiplexer including: (i) A control unit. (ii) At least one input, coupled to the control unit, for receiving at least one basic input data unit sequence. (iii) An output, coupled to the control unit and to a communication module, for providing a multiplexed sequence to a communication module; the communication channel has an available bandwidth. (iv) A modification unit, coupled to control unit, to the at least one input and to the output, the modification unit is configured to modify selected basic media data units to provide corresponding basic media data units, in response to control units from the control unit; wherein a modified selected basic media data unit is smaller than the corresponding selected basic media data unit. The control unit is configured to: (i.i) determine a modification priority of a plurality of basic media data unit of the received at least one basic media data unit sequence; (i.ii) select basic media data units to be modified, in response to the modification priority and to an available bandwidth of the communication module; (i.iii) control the provision of the selected basic media data units to the modification unit and the modification of each of the selected basic media data units; and (i.iv) control the provision of a multiplexed sequence including the modified selected basic media data units and non-selected basic media data units to the communication channel.

According to an aspect of the invention the modification priority of a basic media data unit is responsive to the compression level of the basic media data unit. Conveniently, the modification priority is inversely proportional to the compression level of the basic media data unit. Preferably, a compression level threshold is determined and basic media data units that have a higher compression level are not transmitted or modified. If a modification of a basic media data unit results in a corresponding modified basic media data unit of higher compression level than the threshold, the corresponding modified basic media data unit is not transmitted or applied to the multiplexed sequence. Conveniently, the compression level is learnt from a compression indication, such as but not limited to a quantizing value.

According to an aspect of the invention the modification priority of a basic media data unit is responsive to the quality of the basic media data unit or to a combination of qualities of basic media data units either associated with the basic media data unit or grouped together with the basic media data unit. Conveniently, the modification priority is proportional to the quality of the basic media data unit. Preferably, a quality threshold is determined and basic media data units that have a lower quality are not modified. If a modification of a basic media data unit results in a corresponding modified basic media data unit that has a quality that is below the quality threshold, the corresponding modified basic media data unit is not transmitted or appended to the multiplexed sequence. Conveniently, the quality of portions of the multiplexed sequence can be measured by quality measurement units or from can be learnt from a compression indication, such as but not limited to a quantizing value.

According to an aspect of the invention the modification priority of a basic media data unit is responsive to the quality degradation of the basic media data unit or to a combination of quality degradation of basic media data units either associated with the basic media data unit or grouped together with the basic media data unit. The quality degradation can indicate a quality loss resulting from either additional or previous modification, compression or alteration of a basic media data unit or from the generation of the basic media data unit. Conveniently, the modification priority is inversely proportional to the quality degradation of the basic media data unit. Preferably, a quality degradation threshold is determined and basic media data units of higher quality degradation are not transmitted or modified. If a modification of a basic media data unit results in a corresponding modified basic media data unit that is characterized by quality degradation that is above the quality degradation threshold, the corresponding modified basic media data unit is not transmitted or appended to the multiplexed sequence. Conveniently, the quality degradation of portions of the multiplexed sequence is measured by quality measurement units. According to another aspect of the invention the quality degradation is learnt from signal to noise measurements or from a compression indication, such as but not limited to a quantizing value.

According to an aspect of the invention, the modification priority of a basic media data unit is further responsive to an amount or even to an existence of temporal difference information within the basic media data unit.

According to an aspect of the invention, the modification priority of a basic media data unit is further responsive to a dependency of at least one other basic media data unit upon the basic media data unit. For example, in MPEG compliant video streams, basic media data units such as macroblocks of I-pictures will have a lower modification priority than macroblocks of P-pictures, and macroblocks of P-pictures will have a lower modification priority than macroblocks of B-pictures. As I-pictures and P-pictures can act as anchor pictures of other pictures.

According to an aspect of the invention the modification priority of a basic media data unit is responsive to a combination of at least two of the following parameters: (a) a quality of the basic media data unit; (b) a quality degradation of the basic media data unit; (c) a compression level of the basic media data unit; (d) a dependency of other basic media data unit upon the basic media data unit; (e) a combination of qualities of basic media data units that belong to a same basic media data unit group as the basic media data unit; (f) a combination of quality degradations of basic media data units that belong to a same basic media data unit group as the basic media data unit; (g) a combination of compression levels of basic media data units that belong to a same basic media data unit group as the basic media data unit; (h) size of the basic media data unit; (i) dependency of other basic media data units on the basic media data unit; (j) combination of dependencies of other basic media data units on basic media data units that belong to the same basic media data unit group as the basic media data unit. Conveniently, each one of said parameters is associated with a predefined parameter allowable range, such that basic media data units that are characterized by a parameter that is out of the range are not modified, transmitted or appended to the multiplex.

According to an aspect of the invention, each sequence of basic media data units is distinguishable from at least one other sequence of basic media data units. The modification priority of each basic media data unit belonging to a basic media data unit sequence reflects the entity of the basic media data unit sequence. The modification priority can be further responsive to at least one of the mentioned above parameters (a)-(j).

According to an aspect of the invention, each sequence of basic media data units is to be provided to a corresponding buffer, wherein the modification priority of each basic media data unit of a sequence is responsive to a simulated status of the corresponding buffer. The modification priority can be further responsive to at least one of the mentioned above parameters (a)-(j).

The invention provides a method wherein the modification priority is responsive to external modification priority information. The external priority modification information can be provided by various entities located along a logical path extending from a generating entity of the basic media data units, at least one multiplexing or even re-multiplexing entity, to end-users of the sequences of the basic media data units. The modification priority can be further responsive to at least one of the mentioned above parameters (a)-(j). The external modification priority information reflects at least one of the following parameters: (a1) at least one end-user's preferences; (b1) at least one end-user profile, (c1) at least one end-user's behavior pattern, (d1) at least one media provider's preferences, (e1) at least one media provider profile. Accordingly, the external modification priority is provided by at least one of the following entities: end-user; a group of end-users; a multiplex generator; a basic media data unit provider; and a basic media data unit sequences distributor.

Conveniently, the step of selecting basic media data units to be modified, is preceded by a step of applying at least one lossless technique for generating the multiplexed sequence such that the amount of selected basic media data unit modifications is reduced.

Conveniently, a basic media data unit includes a plurality of media signals, such as MPEG compliant signals; JPEG compliant signals; M-JPEG compliant signals; video signals; audio signals; data signals; H.261 compliant media signals; H.263 compliant signals; streaming media signals; high quality audio signals; AC-3 audio signals; and AAC audio signals. If original media signals, such as analog or digitized media signals are received the method further requires to compress the original media signals to provide compressed media signals. Preferably, a basic media data unit is either a group of pictures, a picture, a slice, a macroblock, or a sequence of macroblocks.

According to yet an aspect of the invention the method further includes a step of transmitting the multiplexed sequence over a communication channel having an available bandwidth and wherein the bandwidth of the multiplexed sequence does not exceed the available bandwidth.

According to an aspect of the invention the system and method provides an multiplexed sequence whereas the basic media data units of the multiplexed sequence are characterized by either an optimal quality, optimal quality degradation, optimal compression level, or a combination of said characteristics. The at least one characteristic of a received basic media data unit can be changed to an optimal value, by setting the modification priority to reflect said parameter, and setting allowable ranges of said parameter.

According to an aspect of the invention, setting a modification priority to be proportional to a characteristic (such as quality, quality degradation, compression level) of a basic media data unit results in a reduction of variance/range of that characteristic in the multiplexed sequence.

According to another aspect of the invention the modification priority of a basic media data unit is determined in accordance with a modification priority function. Conveniently, the modification priority function can be changed dynamically. Preferably, the modification priority function itself is responsive to at least one characteristic of at least a portion of received basic media data units. The characteristics can be either a total amount of basic media data units received during a predefined time period, the amount of basic media data units within at least one sequence of basic media data units, the identity of the received basic media data unit sequences, the quality of at least some of the received basic media data units, the quality degradation of at least some of the received basic media data units, the compression level of at least some of the basic media data units, and the like. The modification priority function can also be responsive to at least one of the following parameters: amount of received basic media data units; amount of basic media data units belonging to predefined basic media data unit sequences; reception rate of received basic media data units; reception rate of basic media data units belonging to predefined basic media data sequences; and the entity of received basic media data unit sequences.

Although the present invention is described predominantly in terms of the transmission and storage of video and audio information encoded in accordance with the MPEG format, the concepts and methods are broad enough to encompass storage and distribution systems using other data compression techniques and other data formats. Throughout this detailed description, numerous details are specified such as data stream structures, in order to provide a thorough understanding of the present invention. For example, it is assumed that a sequence of basic media data units is an MPEG compliant program including at least one MPEG compliant elementary stream, and that the basic media data units are macroblocks. Each video elementary stream includes P-pictures, B-pictures and I-pictures grouped in group of pictures (GOP).

Referring to FIG. 1 illustrating a statistical multiplexer 12 and its surroundings, in accordance to a preferred embodiment of the invention. Statistical multiplexer 12 is coupled to digital storage medium 8, satellite receiver 11 and a compressed media source 10, such as an MPEG compliant encoder, for receiving programs. Statistical multiplexer 12 is also coupled to control interface unit 11 for receiving information such as external modification priority information. Statistical multiplexer 12 has an output port for providing a multiplexed sequence, such as a transport stream. The output port is coupled to a communication channel 7 that has an available bandwidth for conveying the transport stream.

Controllable analyzer 13 is coupled to communication module 7 and to statistical multiplexer 12, for analyzing basic media data units, modified basic media data units, groups of basic media data units, groups of modified basic media data units, a portion of the transport stream, and the like. Optionally, controllable analyzer 13 is also configured to measure the available bandwidth of communication channel 7. Statistical multiplexer 12 is configured to send controllable analyzer 13 control signals for determining which basic media data units, modified basic media data units, groups of basic media data units, groups of basic media data units, or portion of the transport stream to analyze.

Conveniently, controllable analyzer 13 has a quality measurement unit, for measuring a quality of at least one basic media data unit at a time. Conveniently, controllable analyzer can measure a media picture, including a plurality of basic media pictures at a time. Preferably, the media pictures are MPEG compliant and the quality measurement is based upon an analysis of MPEG artifacts. Controllable analyzer 13 can include at least one quality measurement unit such as Rhode & Schwartz DVQ or Tektronix quality of service monitor PQM300. These quality analyzers are configured to analyze some programs out of a larger number of programs within the transport stream. The selection of the analyzed programs can reflect various parameters, such as a predefined program priority, amount and extent of program modifications during a predefined time period, and the like. The selection can also be random, arbitrary or of a predefined pattern. Conveniently, the results of the analysis provide relatively long-term statistics and can be used to adjust the modification priorities of various programs.

Conveniently, the basic media data units are MPEG compliant and the modification can be implemented by at least one of the following methods: removing filler pictures; removing stuffing bits; selectively setting DCT coefficients to zero; discarding data used to represent selected media pictures; discarding data used to represent selected media pictures and generating repeat information in the bit stream such that a decoder can repeat the dropped pictures; re-quantizing quantized DCT coefficients; extracting and changing the quantization scale factors; decoding and encoding at different bit rates; and changing the resolution of a video image.

Figure 2:
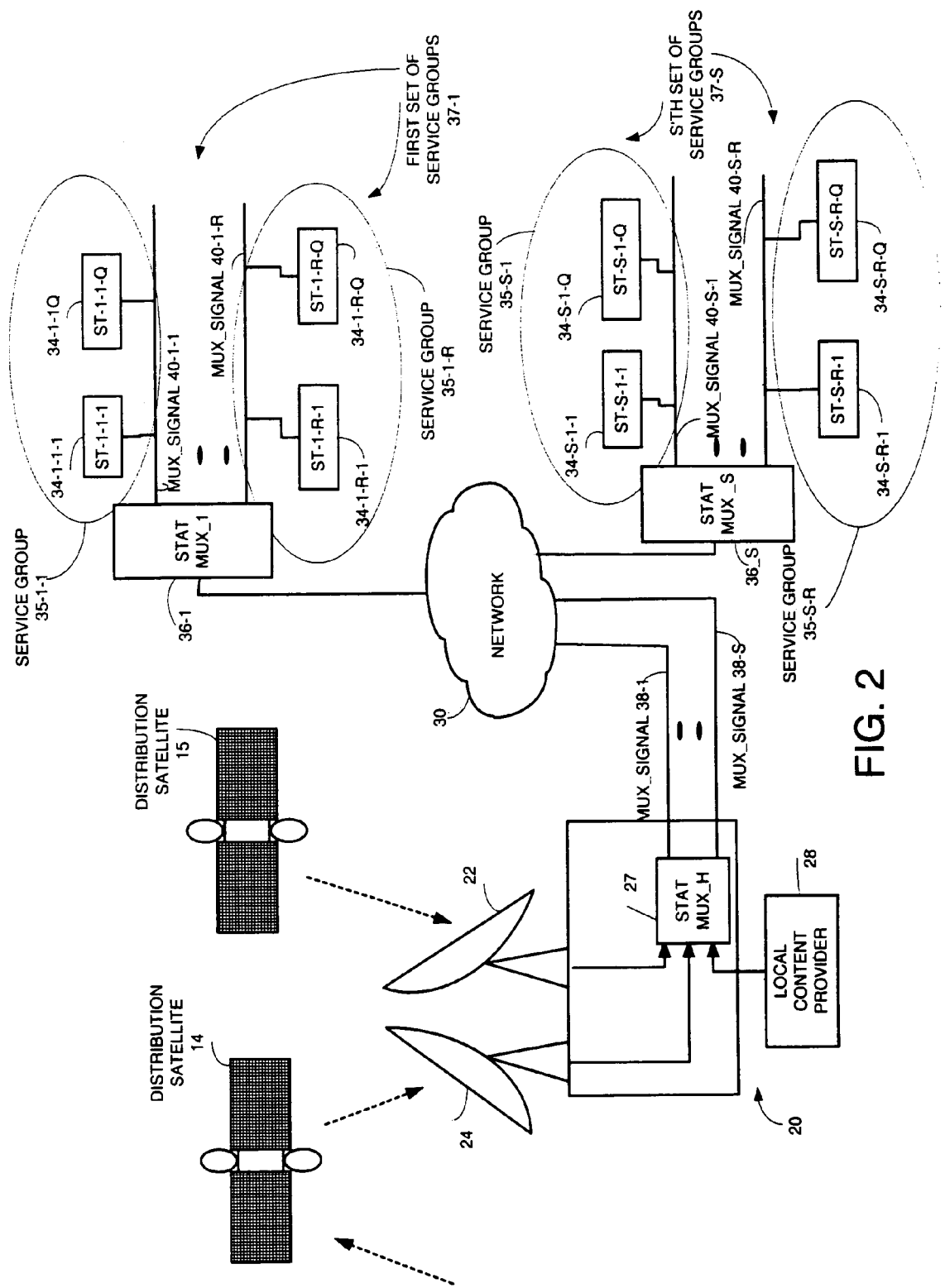
FIG. 2 is a schematic description of a plurality of statistical multiplexers coupled to a plurality of sets of service groups, constructed and operative in accordance with preferred embodiments of the present invention.

Referring to FIG. 2, illustrating statistical multiplexers such as statistical multiplexer (SM-H) 27 and statistical multiplexers (SM-s) 36-1-36-S, that are coupled to a plurality of sets of service groups, constructed and operative in accordance with preferred embodiments of the present invention. A local distribution center 20, also referred to as headend 20, is configured to receive information signals from distribution satellites 14 and 15, via satellite dishes 24, 22 and to receive signals from headend content provider 28. These information signals include a plurality of MPEG compliant programs. Local distribution center 20 selects some of the received signals and combines the selected signals to form a multiplexed signal such as MUX_SIGNAL 38-1-38-S.

Although not illustrated in FIG. 2, local distribution center 20 and hubs are further configured to receive upstream signals. These upstream signals can include external modification priority information that reflects end-user's preferences and the like.

Each service group set 37-$s$ includes r service groups 35-$s$-$r$, each service group 35-$s$-$r$ includes q end-users 34-$s$-$r$-$q$. Index r ranges between 1 and R, index s ranges between 1 and S, and index q ranges between 1 and Q.

SM-H 27 is functionally located within local distribution center 20 and each of SM-s 36-$s$ is functionally located within each hub. SM-s 36-$s$ is coupled to the s'th set of service groups 37-$s$, via broadband networks, such as HFC, DSL networks and the like, and is configured to provide each service group 35-$s$-$r$ of the s'th set of service groups 37-$s$ a distinct content. For convenience of explanation the multiplexed signal provided to the r'th service group of the s'th set of service groups is denoted MUX_SIGNAL 40-$s$-$r$. MUX_SIGNAL 40-$s$-$r$ includes a plurality of packets such as MPEG compliant transport packets to be provided to the service group 35-$s$-$r$ during at least one session.

SM-H 27 is configured to provide each of SM-s 36-$s$ a distinct multiplexed signal, denoted MUX_SIGNAL-s. MUX_SIGNAL-s includes a plurality of packets such as MPEG compliant transport packets to be provided to set of service groups 37-$s$ during at least one session. Each of SM-s 36-$s$ is configured to receive MUX-SIGNAL-s 38-$s$, and to select out of MUX_SIGNAL-s 38-$s$ a plurality of multiplexed portions, each portion to be provided to a distinct service group out of the R service groups of the s'th set of service groups coupled to SM-s 36-$s$. SM-s 36-$s$ are usually further adapted to receive additional signals, such as data signals, media signals, advertisement signals and the like from local content providers, such as hub content provider (not shown) and to add the additional signals to the multiplexed portions to provide MUX-SIGNAL 40-$s$-$r$. MUX-SIGNAL 40-$s$-$r$ includes a plurality of packets such as MPEG compliant transport packets.

Each of statistical multiplexers 36-$s$ and 27 can further be coupled to controllable analyzer, digital storage medium and a control interface unit such as controllable analyzer 13, digital storage medium 8 and a control interface unit 11 of FIG. 1.

A statistical multiplexer can have various configurations, such as centralized or a parallel configurations and the like. In a centralized configuration, various processing steps, such as the calculation of a modification priority, the modification of basic media data units and the provision of a multiplexed sequence to a communication module are executed by a control unit, and a modification unit. The statistical multiplexer includes (a) a control unit, (b) at least one input, coupled to the control unit, for receiving at least one basic input data unit sequence, (c) an output, coupled to the control unit and to a communication module, for providing a multiplexed sequence to the communication module, (d) a modification unit, coupled to control unit, to the at least one input and to the output, the modification unit is configured to modify selected basic media data units to provide corresponding basic media data units, in response to control units from the control unit; wherein a modified selected basic media data unit is smaller than the corresponding selected basic media data unit. The control unit is configured to: (i) determine a modification priority of each basic media data unit of the received at least one basic media data unit sequence; (ii) select basic media data units to be modified, in response to the modification priority and to an available bandwidth of the communication module; (iii) control the provision of the selected basic media data units to the modification unit and the modification of each of the selected basic media data units; and (iv) control the provision of a multiplexed sequence including the modified selected basic media data units and non-selected basic media data units to the communication channel.

Figure 6:
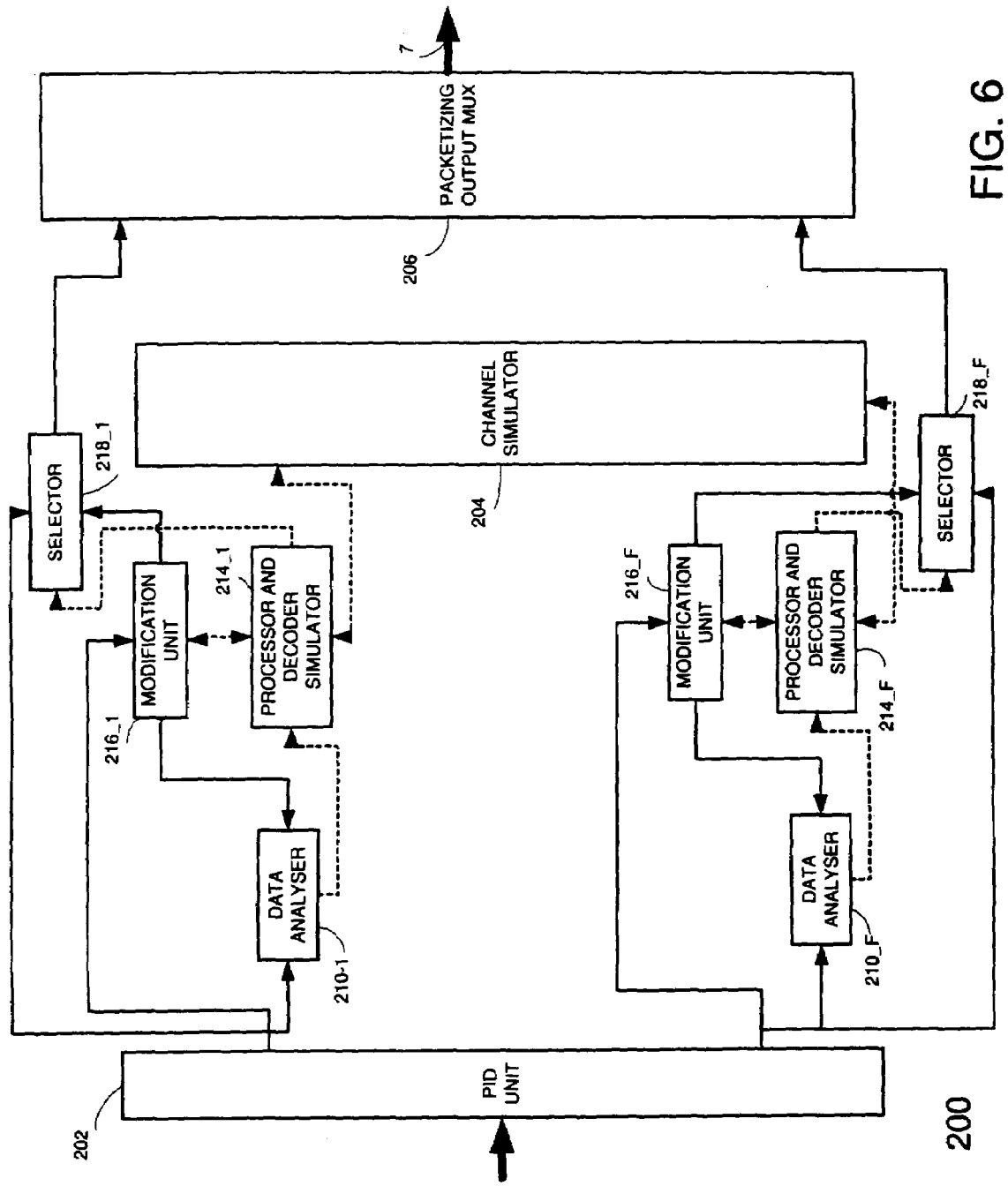
FIG. 6 is a schematic description of a statistical multiplexer, in accordance to a preferred embodiment of the invention.

In a distributed configuration, each sequence of basic media data unit is processed by a single sequence processor, and the various basic media data units are distributed among the plurality of sequence processor by a centralized distribution unit. A distributed configuration is illustrated at FIG. 6. It is assumed, for convenience of explanation only that the basic media data units are MPEG compliant, that each sequence of basic media data units has a distinct PID, and that a basic media data unit is a macroblock.

Portion 200 includes a PID unit 202, channel simulator 204, packetizer and output multiplexer 206. A plurality (F) of sequence processors 220-f are coupled between PID unit 202 and channel simulator 204 and between PID unit 202 to packetizer and output multiplexer 206. Each sequence processor 220-f includes data analyzer 210-f, modification unit 216-f, processor and decoder simulator 214-f and a selector 218-f. Index f ranges between 1 and F, F is a positive integer that either exceeds the amount of possible programs or equals said amount. The data paths and control and status paths are illustrated by two types of arrows, the latter are illustrated by dashed lines, while the former are illustrated by solid lines.

PID unit 202 is conveniently preceded by an assembly unit (not shown) that receives packet such as transport packets and provides PID unit 202 media segments of elementary streams that are included within the packets payloads. PID unit 202 receives the segments of the elementary streams and provides each elementary stream to a sequence processor in view of the PID of the elementary stream segment.

First sequence processor 220-1 includes data analyzer 210-1, modification unit 216-1, processor and decoder simulator 214-1 and selector 218-1. First sequence processor 220-1 receives segments of a predefined elementary stream. It is assumed that the elementary stream segments include a plurality of macroblocks and associated data that are arranged as I-pictures, B-pictures and P-pictures. Each macroblock is provided to: (a) data analyzer 210-1, to be analyzed, (b) modification unit 216_1, to generate at least one corresponding modified basic media data unit; and to (c) selector 218_1, that eventually provides either the macroblock or a corresponding modified macroblock to packetizer and output multiplexer 206. Data analyzer 210-1 also receives and accordingly analyzes modified macroblocks.

Data analyzer 201-1 is coupled to (i) PID unit 202, (ii) modification unit 216_1 and (iii) processor and decoder simulator 214_1 for (i) receiving segments of the elementary stream, (ii) receiving modified macroblocks, and (iii) providing to processor and decoder simulator 214_1 control and status information, such as macroblock and modified macroblock size, macroblock and modified macroblock quantizer scale, timing information related to the macroblock, a dependency of other macroblocks on a received macroblock, picture type, end and beginning of slices and pictures and the like.

Processor and decoder simulator 214_1 is coupled to modification unit 216_1 for determining which macroblocks to modify, and optionally in which manner. Processor and decoder simulator 214_1 is also coupled to channel simulator 204 for (i) providing status and control information such as size of macroblocks or modified macroblocks to be provided to communication channel 7, timing information of the macroblocks or modified macroblocks, modification priority of macroblocks, and for (ii) receiving information indicating an amount or the entity (identification) of macroblocks or modified macroblocks that can be transmitted over communication channel. Channel simulator 204 receives a bandwidth indication representing an available bandwidth of communication module 7 and determines which macroblocks/modified macroblocks can be provided to the communication module. Processor and decoder simulator 214_1 is configured to receive external modification priority information, if said information is relevant to the first elementary stream. Processor and decoder simulator 214_1 is also coupled to selector 218_1 for selecting whether to provide a macroblock or a modified macroblock to packetizer and output multiplexer 206. Packetizer and output multiplexer 206 packetizes the received macroblocks to generate transport packets and multiplexes the macroblocks and modified macroblocks sent from selectors $218\_1\text{-}218\_F$ to communication channel 7.

Figure 3:
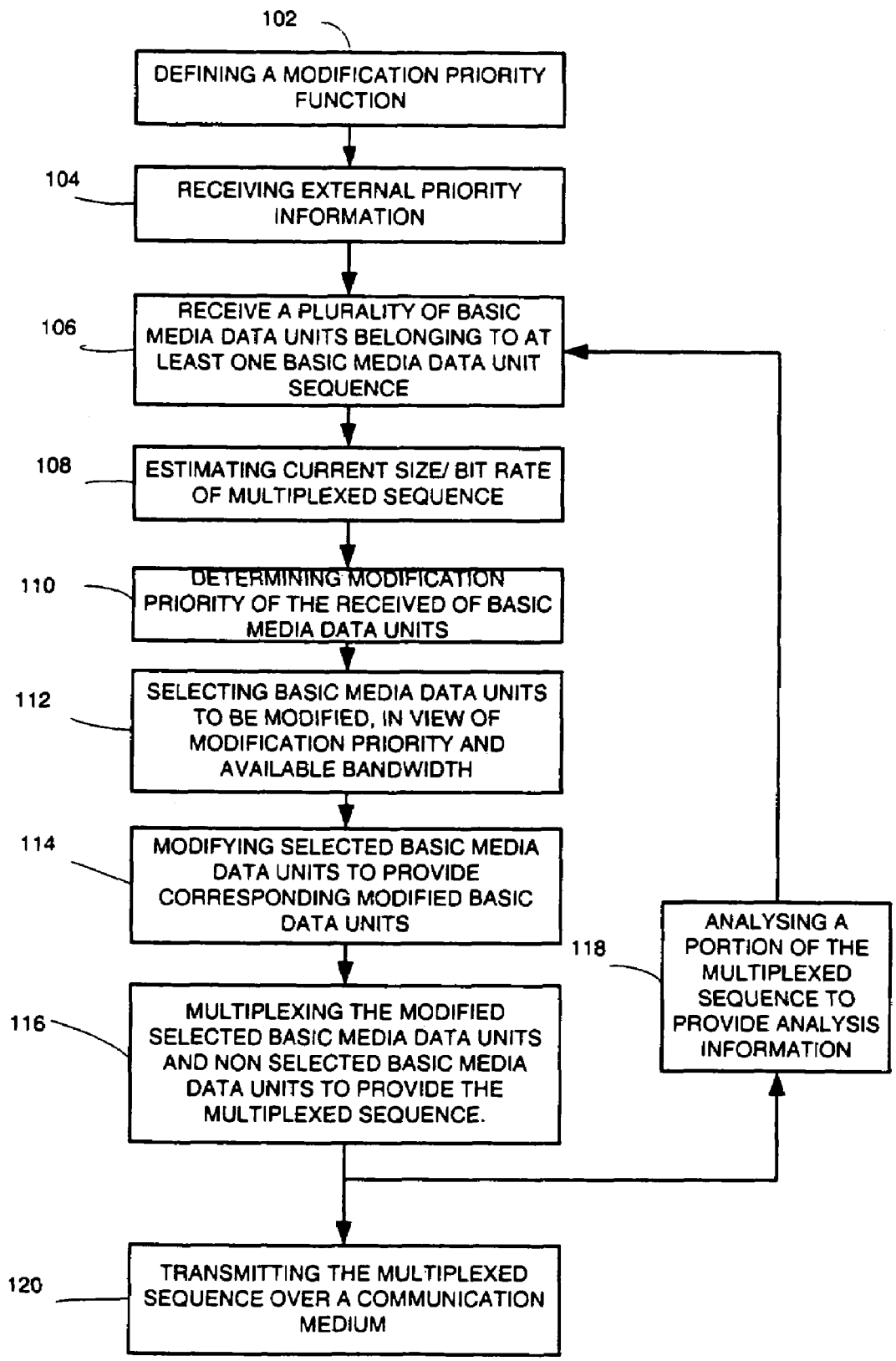
FIG. 3 is a flow chart diagram of a method for generating a multiplexed sequence of basic media data units and modified basic media data units to be transmitted over a communication medium, in accordance with another preferred embodiment of the invention.

Referring to FIG. 3 illustrating a method 100 for generating a multiplexed sequence of basic media data units to be transmitted over a communication medium, in accordance with another preferred embodiment of the invention.

Method 100 starts by step 102 of defining a modification priority function. Step 102 allows for a selection between various combinations of at least one of the following parameters of a basic media data unit: (a) a quality of the basic media data unit; (b) quality degradation of the basic media data unit; (c) compression level of the basic media data unit; (d) a dependency of other basic media data unit upon the basic media data unit; (e) a combination of qualities of basic media data units that belong to a same basic media data unit group as the basic media data unit; (f) a combination of quality degradations of basic media data units that belong to a same basic media data unit group as the basic media data unit; (g) a combination of compression levels of basic media data units that belong to a same basic media data unit group as the basic media data unit; (h) size of the basic media data unit; (i) dependency of other basic media data units on the basic media data unit; (j) combination of dependencies of other basic media data units on basic media data units that belong to the same basic media data unit group as the basic media data unit. Conveniently, step 102 also includes a determination of the allowable range of each parameter. Assuming that the basic media data unit is a macroblock, and that macroblocks are grouped in pictures, the quantizing level of the macroblock can reflect the quality degradation of a macroblock and the compression level of the macroblock. The dependency between pictures can be learnt from their type (I-picture, P-picture and B-picture), an amount of temporal difference information contained within each picture, and the content of the picture itself, such as the content of the motion vectors. The quantization level can also reflect the quality of each macroblock. The quality can also be selectively measured by measurement units such as controllable analyzer 13 of FIG. 1. For example, a modification priority $MP_{X,Z}$ of the x'th basic media data unit of the z'th basic media data unit sequence $(BM_{X,Z})$ can be equal to $(5+EMP_Z-PT_{X,Z})*QS_{X,Z}$, $EMP_Z$ reflects an external modification priority given to the z'th sequence of basic media data units, $PT_{X,Z}$ reflects a dependency of at least one other basic media data unit upon $BM_{X,Z}$ and $QS_{X,Z}$ is the quantization level of $BM_{X,Z}$. In such a case the variance of quantizer levels of received basic media data units is larger than the variance of the quantizing levels within the multiplexed sequence.

Conveniently, the modification priority function can be changed dynamically, and step 102 can include defining the possible allowable changes. Accordingly step 102 can include defining a plurality of modification priority functions and when to apply each of said functions.

Step 102 is followed by step 104 of receiving external modification priority information. The external modification priority information can be provided by various entities located along a logical path extending from a generation entity of the basic media data units, at least one multiplexing or even re-multiplexing entity to end-users. Referring to the example set forth in FIG. 2, SM-1 36-1 can receive external modification priority information from a hub controller (not shown), from at least one end-user 34-1-r-q, from at least one service group 35-1-r and can also process the behavior pattern or preferences of more than a single end-user or more than a single service group 35-1-r to generate external modification priority information. SM-H 27 can receive external priority information from local content provider 28, from the operator of local distribution center 20 and can further receive such information from end-users, service groups, sets of service groups and hubs. SM-H 27 can also process the behavior pattern of end-users, service groups and sets of service groups to produce the external priority information. Each statistical multiplexer can receive external modification priority information from a higher entity, such as from a media stream generator or provider responsive to the provision of signals via distribution satellites 14 and 15. Each statistical multiplexer out of SM-s 36-s and SM-H 27 can be further adapted to filter received transport packet in view of the transport packet program. The programs entity can be learnt from the PID embedded within each transport stream packet.

Step 104 is followed by step 106 of receiving a plurality of basic media data units belonging to at least one basic media data unit sequence. Referring to the example set forth in the upper part of FIG. 5, a plurality of basic media data units referenced $50_{i,j}$, are received during P consecutive time slots. Index i denotes a basic media data unit and index j denotes a basic media data unit sequence index. Index i ranges between 1 and either M,N,O or P, index j ranges between 1 and K. It is assumed, for convenience of explanation only, that K basic media data unit sequences are provided in parallel to statistical multiplexer 12 over a plurality of communication channels and that packets that include up to K basic media data units can be provided during a single time slot of a predefined length. The first basic media data unit sequence includes M basic media data units referenced $50_{1,1}$-$50_{1,M}$ that were received during M consecutive time slots. The second basic media data unit sequence includes P basic media data units referenced $50_{2,1}$-$50_{2,P}$ that were received during P consecutive time slots. The third basic media data unit sequence includes L basic media data units referenced $50_{3,1}$-$50_{3,L}$ that were received during L consecutive time slots. The K'th basic media data unit sequence includes N basic media data units referenced $50_{1,1}$-$50_{1,N}$ that were received during N consecutive time slots. L<M<N<P. Conveniently, step 106 includes analyzing at least some of the characteristics of the basic media data units to provide an analysis that can change the modification priority function.

Figure 5:
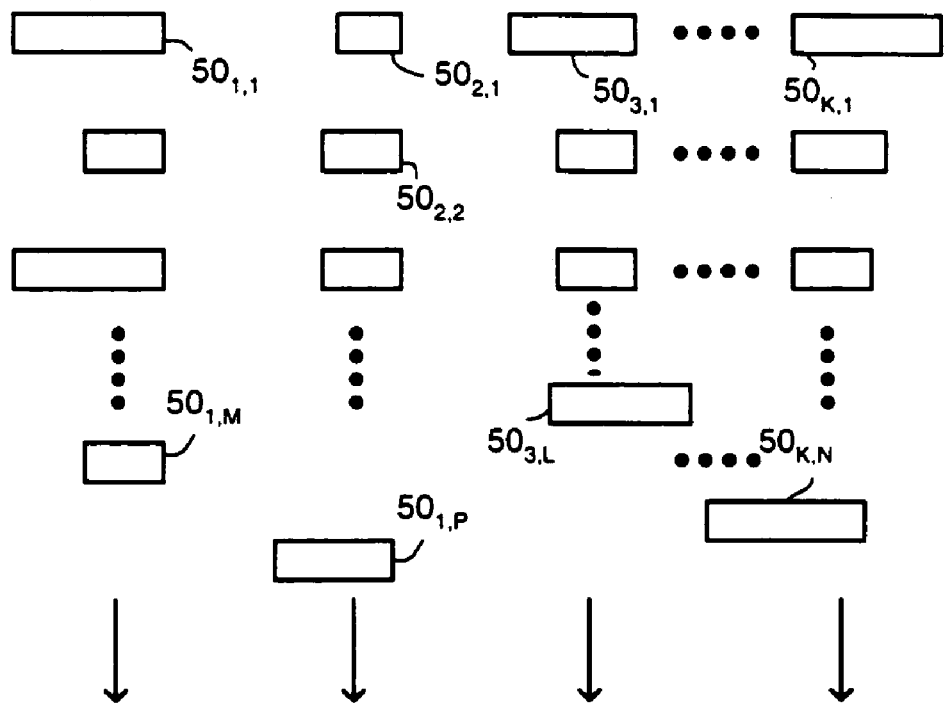
FIG. 5 illustrates a plurality of received basic media data units and a content of a multiplexed sequence, in accordance to a preferred embodiment of the invention.
Figure 5:
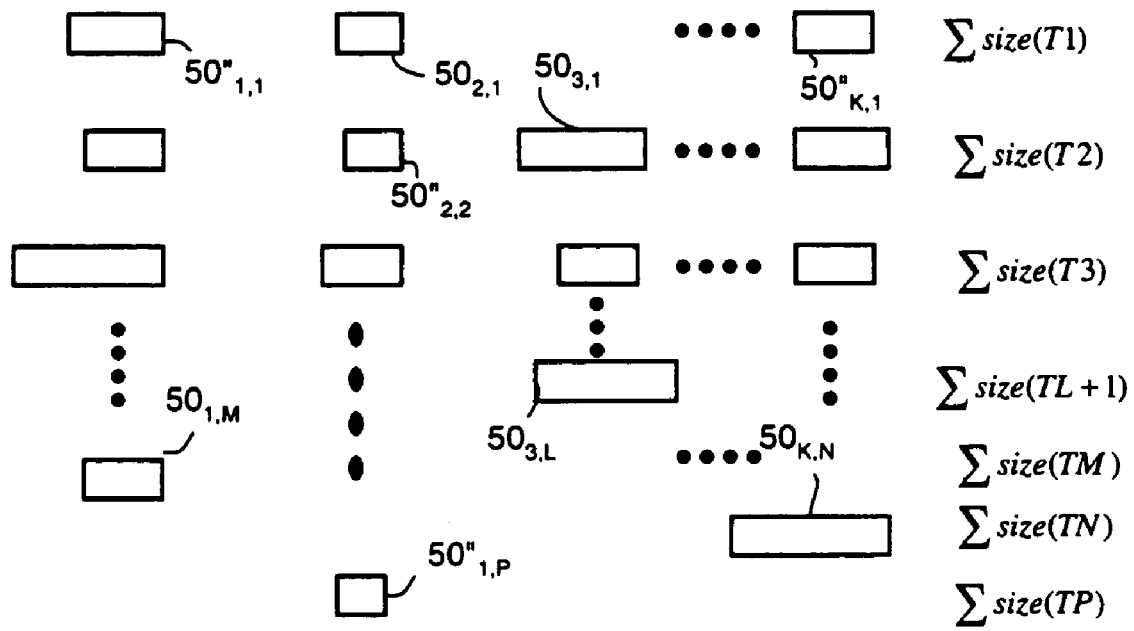

Step 106 is followed by step 108 of estimating the current size or bit rate of the multiplexed sequence. The size of the multiplexed sequence must match an available memory space of a digital storage medium or, as illustrated in FIGS. 1, 2 and 5, an available bandwidth of a communication medium. Methods and systems for estimating an available bandwidth are known in the art. Briefly, the available bandwidth can either be measured or known in advance. In cases where the available bandwidth is fixed, step 110 can be skipped, as long as the fixed available bandwidth is known to method 100.

Step 108 is followed by step 110 of determining a modification priority of the received basic media data units. Step 108 includes applying the modification priority scheme that was defined in step 102 on the received basic media data units. Step 108 can also include a step of changing the modification priority function in view of the characteristics of the received basic media data units.

Step 110 is followed by step 112 of selecting basic media data units to be modified, in view of their modification priority and optionally in view of the current size/bit rate of the multiplexed sequence.

Step 112 is followed by step 114 of modifying selected basic media data units to provide corresponding modified basic media data units. This step includes modifying basic media data units, starting with the basic media data units of the highest modification priority and continuing to lower modification priority basic media data units while constantly tracking the aggregate size of modified and not modified basic media data units to assure that the aggregate size does not exceed the size estimated in step 108. Conveniently, the constant tracking allows stopping the modification after the aggregate size either matches the required aggregate size or is just slightly below the required aggregate size.

Step 114 is followed by step 116 of multiplexing the modified selected basic media data units to provide the multiplexed sequence. Referring to the example set forth in the lower part of FIG. 5, in which the content of a multiplexed sequence is illustrated, a plurality of modified and not modified basic media data units form a multiplexed sequence. The aggregate size of modified and not modified basic data units forming the multiplexed sequence at time slots T1-$T_p$ are denoted $\Sigma$size $(T_1)$-$\Sigma$size$(T_p)$ respectively. During time slot T1 a plurality of basic media data units are provided to a communication module. Accordingly, the multiplexed sequence includes basic media data units $50_{2,1}$, and modified basic media data units $50''_{1,1}$ and $50''_{k,1}$. The implementation of lossless techniques is illustrated by basic media data unit $50_{3,1}$ that is delayed and is transmitted along with basic media data units and modified basic media data units that were received after it. Basic media data units and modified basic media data units of the first sequence are transmitted during $T_1$-$T_M$. Basic media data units and modified basic media data units of the second sequence are transmitted during $T_1$-$T_p$. Basic media data units and modified basic media data units of the third sequence are transmitted during $T_2$-$T_{L+1}$. Basic media data units and modified basic media data units of the fourth sequence are transmitted during $T_1$-$T_N$.

Step 116 is followed by step 120 of transmitting the multiplexed sequence over a communication media. It is noted that although step 120 illustrates a transmission of the multiplexed sequence, and preferably a transmission to a remote location, step 116 can be followed by a step of storing the multiplexed sequence in a digital storage medium. Conveniently, the size of the multiplexed sequence has to match the available space of the digital storage means.

Step 116 is also followed by step 118 that is followed by step 106. Step 118 includes analyzing a portion of the multiplexed sequence to provide analysis information. Referring to the example set forth in FIG. 1, step 118 can include an analysis of a portion of the multiplexed sequence by a quality measurement unit of controllable analyzer 13. The selection of the analyzed programs can reflect various parameters, such as a predefined program priority, amount and extent of program modifications during a predefined time period, and the like. The results of the analysis provide relatively long-term statistics and can be used to adjust the modification priorities of various programs.

Figure 4:
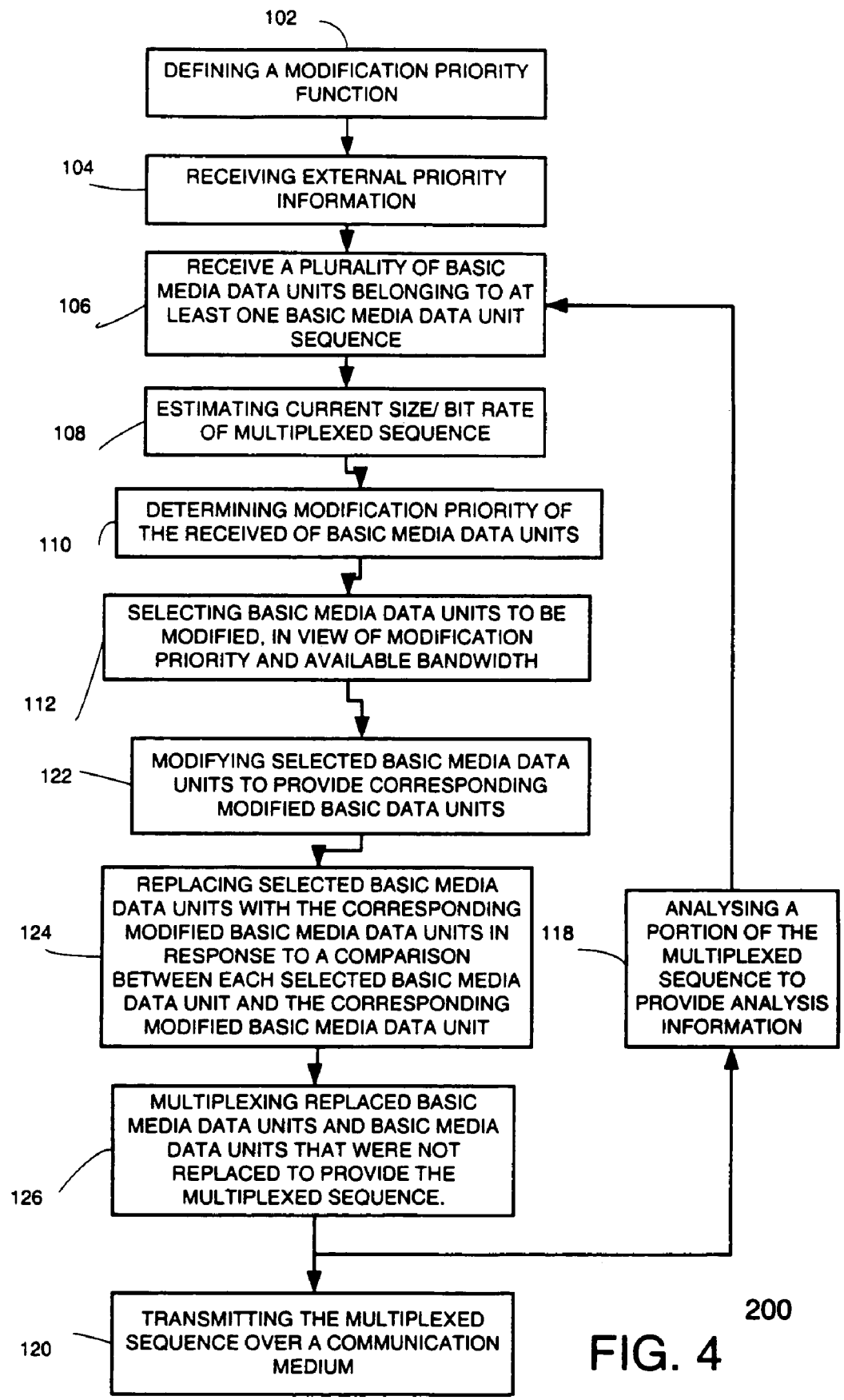
FIG. 4 is a flow chart diagram illustrating a method for generating and transmitting a multiplexed sequence over a communication channel.

Referring to FIG. 4 illustrating method 200 for generating and transmitting a multiplexed sequence over a communication channel. The multiplexed sequence includes at least one basic media data unit sequence. Method 200 is analogues to method 100 but steps 114 and 116 are replaced by steps 122, 124 and 126.

Step 122 includes modifying each of the selected basic media data units to provide corresponding modified basic media data units. Conveniently, step 122 does not include a step of constantly tracking the aggregate size of modified and not modified basic media data units to assure that the aggregate size does not exceed the size estimated in step 108.

Step 122 is followed by step 124 of replacing selected basic media data units with the corresponding modified basic media data units in response to a comparison between the basic media data units and the corresponding modified basic media data units to provide replaced basic media data units. According to an aspect of the invention the comparison between a basic media data unit and a corresponding modified basic media data unit can include comparing between a combination of at least one of the following parameters: (a) quality; (b) combination of qualities of basic media data unit group members; (c) compression level; (d) combination of compression levels of basic media data unit group members; (e) temporal difference information; (f) combination of temporal difference information of basic media data unit group members; (g) size of the basic media data unit and the corresponding basic media data unit. According to another aspect of the invention the replacement of selected basic media data units by corresponding basic media data units is responsive to a comparison between a basic media data unit, a corresponding modified basic media data unit; another basic media data unit, another corresponding basic media data unit. The comparison can include comparing between a combination of at least two of the following parameters: (a) quality; (b) combination of qualities of basic media data unit group members and combination of qualities of other basic media data unit group members; (c) compression level; (d) combination of compression levels of basic media data unit group members and combination of compression levels of other basic media data unit group; (e) temporal difference information; (f) combination of temporal difference information of basic media data unit group members and combination of temporal difference information of other basic media data unit group members; and (g) size.

According to an aspect of the invention, step 124 includes a step of constantly tracking the aggregate size of the replaced and non-replaced basic media data units to assure that the aggregate size of the multiplexed sequence does not exceed the size estimated in step 108. Conveniently, the constant tracking allows stopping the replacement after the aggregate size either matches the required aggregate size or is just slightly below the required aggregate size.

Step 124 is followed by step 126 of multiplexing the replaced basic media data units and basic media data units that were not replaced to provide the multiplexed sequence.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. Computer implemented method for generating a multiplexed sequence, the method comprising the steps of:
receiving at least one basic media data unit sequence;
determining modification priorities for a plurality of basic media data units belonging to the at least one basic media data unit sequence;
selecting basic media data units to be modified, in response to the modification priority of each basic media data unit;
modifying each of the selected basic media data units without altering dependencies of the selected basic media data units; wherein a modified selected basic media data unit is smaller than the corresponding selected basic media data unit; and
multiplexing the modified selected basic media data units and non-selected basic media data units to provide the multiplexed sequence.

2. The method according to claim 1 wherein the modification priority of a basic media data unit is responsive to a quality of the basic media data unit.

3. The method according to claim 2 further comprising the step of preventing the modification of basic media data units of a quality that is lower than a quality threshold.

4. The method according to claim 1 wherein basic media data units are arranged in groups and wherein the modification priority of a basic media data unit belonging to a group is responsive to a combination of qualities of basic media data units belonging to the group.

5. The method according to claim 1 wherein the modification priority of a basic media data unit is responsive to a compression level of the basic media data unit.

6. The method according to claim 5 further comprising the step of preventing the modification of basic media data units of a compression level that is higher than a compression level threshold.

7. The method according to claim 1 wherein basic media data units are arranged in groups and wherein the modification priority of a basic media data unit belonging to a group is responsive to a combination of compression levels of basic media data units belonging to the group.

8. The method according to claim 1 wherein the modification priority of a basic media data unit is responsive to a quality degradation of the basic media data unit.

9. The method according to claim 8 further comprising the step of preventing the modification of basic media data units of quality degradation that is higher than a quality degradation threshold.

10. The method according to claim 1 wherein the modification priority of each basic media data unit reflects the sequence of basic media data units to which it belongs.

11. The method according to claim 1 wherein each basic media data unit sequence is to be provided to a corresponding buffer; wherein the modification priority of each basic media data unit belonging to a basic media data unit sequence is responsive to a simulated status of the corresponding buffer.

12. The method according to claim 1 wherein the modification priority of a basic media data unit is responsive to external modification priority information.

13. The method according to claim 12 wherein at least a portion of the multiplexed sequence is provided to at least one end-user; and wherein the external modification priority information reflects at least one end-user's preferences.

14. The method according to claim 12 wherein at least a portion of the multiplexed sequence is provided to at least one end-user; and wherein the external modification priority information reflects at least one end-user's profile.

15. The method according to claim 12 wherein at least a portion of the multiplexed sequence is provided to at least one end-user; and wherein the external modification priority information reflects at least one end-user's behavior pattern.

16. The method according to claim 12 wherein at least a portion of the multiplexed sequence is multiplexed by at least one media provider, and the external modification priority information reflects a parameter selected from the list consisting of:
- at least one media provider's preference; and
- at least one media provider's profile.

17. The method according to claim 12 wherein at least a portion of the multiplexed sequence is generated by at least one media provider, and the external modification priority information reflects a parameter selected from the list consisting of:
- at least one media provider's preference; and
- at least one media provider's profile.

18. The method according to claim 12 wherein the external modification priority is provided by at least one entity selected from the group consisting of:
- an end-user;
- a group of end-users;
- a multiplex sequence generator;
- a basic media data unit provider; and
- a basic media data unit sequences distributor.

19. The method according to claim 12 wherein the modification priority of a basic media data unit is further responsive to a combination of quality degradations of basic media data units that belong to a same basic media data unit group as the basic media data unit.

20. The method according to claim 12 wherein the modification priority of a basic media data unit is further responsive to a combination of qualities of basic media data units that belong to a same basic media data unit group as the basic media data unit.

21. The method according to claim 12 wherein the modification priority of a basic media data unit is further responsive to a combination of compression levels of basic media data units that belong to a same basic media data unit group as the basic media data unit.

22. The method according to claim 12 wherein the modification priority of a basic media data unit is responsive to a combination of at least two parameters selected from the list consisting of:
- a quality of the basic media data unit;
- a quality degradation of the basic media data unit;
- a compression level of the basic media data unit;
- a dependency of the basic media data unit upon other basic media data unit;
- a combination of qualities of basic media data units that belong to a same basic media data unit group as the basic media data unit;
- a combination of quality degradations of basic media data units that belong to a same basic media data unit group as the basic media data unit; and
- a combination of compression levels of basic media data units that belong to a same basic media data unit group as the basic media data unit.

23. The method according to claim 1 wherein the modification priority of a basic media data unit is responsive to a dependency of at least one other basic media data unit upon the basic media data unit.

24. The method according to claim 23 wherein the dependency is reflected by temporal difference information.

25. The method according to claim 1, wherein the step of selecting is preceded by a step of applying at least one lossless technique for generating the multiplexed sequence such that the amount of selected basic media data unit modifications is reduced.

26. The method according to claim 1, wherein a basic media data unit is selected from the list consisting of:
- a group of pictures;
- a picture;
- a frame;
- a slice;
- a macroblock; and
- a sequence of macroblocks.

27. The method according to claim 1, wherein a basic media data unit comprising signals selected from the list consisting of:
- MPEG compliant signals;
- original media signals;
- JPEG compliant signals;
- video signals;
- audio signals;
- data signals;
- H.261 compliant media signals;
- H.263 compliant signals;
- streaming media signals;
- high quality audio signals;
- AC-3 audio signals; and
- AAC audio signals.

28. The method according to claim 1, further comprising a step of transmitting the multiplexed sequence over a communication channel having an available bandwidth; and
  wherein the bandwidth of the multiplexed sequence does not exceed the available bandwidth.

29. The method according to claim 1, further comprising a step of storing the multiplexed at a digital medium having an available storage space and wherein the size of the multiplexed sequence does not exceed the available storage space.

30. A computer implemented method for generating and transmitting a multiplexed sequence over a communication channel, the communication channel has an available bandwidth, the method comprising the steps of:
- receiving at least one basic media data unit sequence;
- determining a modification priority of a plurality of basic media data unit of the received at least one basic media data unit sequence;
- selecting basic media data units to be modified, in response to the modification priority and to the available bandwidth;
- modifying each of the selected basic media data units without altering dependencies of the selected basic media data units; wherein a modified selected basic media data unit is smaller than the corresponding selected basic media data unit; and
- providing the multiplexed sequence to the communication channel, the multiplexed sequence comprising modified selected basic media data units and non-selected basic media data units.

31. The method according to claim 30 wherein the modification priority of a basic media data unit is responsive to a quality of the basic media data unit.

32. The method according to claim 31 further comprising the step of preventing the modification of basic media data units of a quality that is lower than a quality threshold.

33. The method according to claim 30 wherein basic media data units are arranged in groups and wherein the modification priority of a basic media data unit belonging to a group is responsive to a combination of qualities of basic media data units belonging to the group.

34. The method according to claim 30 wherein the modification priority of a basic media data unit is responsive to a compression level of the basic media data unit.

35. The method according to claim 34 further comprising the step of preventing the modification of basic media data units of a compression level that is higher than a compression level threshold.

36. The method according to claim 30 wherein basic media data units are arranged in groups and wherein the modification priority of a basic media data unit belonging to a group is responsive to a combination of compression levels of basic media data units belonging to the group.

37. The method according to claim 30 wherein the modification priority of a basic media data unit is responsive to a quality degradation of the basic media data unit.

38. The method according to claim 37 further comprising the step of preventing the modification of basic media data units of quality degradation that is higher than a quality degradation threshold.

39. The method according to claim 30 wherein the modification priority of each basic media data unit reflects the sequence of basic media data units to which it belongs.

40. The method according to claim 30 wherein each sequence of basic media data unit is to be provided to a corresponding buffer; wherein the modification priority of each basic media data unit of a sequence is responsive to a simulated status of the corresponding buffer.

41. The method according to claim 30 wherein the modification priority of a basic media data unit is responsive to external modification priority information.

42. The method according to claim 30 wherein the modification priority of a basic media data unit is further responsive to the dependency of at least one other basic media data unit upon the basic media data units.

43. The method according to claim 30, wherein the step of selecting is preceded by a step of applying at least one lossless technique for generating the multiplexed sequence, such that the amount of selected basic media data unit modifications is reduced.

44. A statistical multiplexer for providing a multiplexed sequence including at least one basic media data sequence, the statistical multiplexer comprising:
  a control unit;
  at least one input, coupled to the control unit, for receiving at least one basic input data unit sequence;
  an output, coupled to the control unit and to a communication module, for providing a multiplexed sequence to a communication module; the communication channel has an available bandwidth;
  a modification unit, coupled to control unit, to the at least one input and to the output, the modification unit is configured to modify selected basic media data units to provide corresponding basic media data units, in response to control units from the control unit, without altering dependencies of the selected basic media data units;
  wherein a modified selected basic media data unit is smaller than the corresponding selected basic media data unit;
  wherein the control unit is configured to:
    determine a modification priority of a plurality of basic media data unit of the received at least one basic media data unit sequence;
    select basic media data units to be modified, in response to the modification priority and to an available bandwidth of the communication channel;
    control provision of the selected basic media data units to the modification unit and the modification of each of the selected basic media data units; and
    control provision of a multiplexed sequence including the modified selected basic media data units and non-selected basic media data units to the communication channel.

45. The statistical multiplexer according to claim 44 wherein the modification priority of a basic media data unit is responsive to a quality degradation of the basic media data unit.

46. The statistical multiplexer according to claim 44 wherein the modification priority of each basic media data unit reflects the sequence of basic media data units to which it belongs.

47. The statistical multiplexer according to claim 44 wherein each sequence of basic media data unit is to be provided to a corresponding buffer at a remote location; wherein the statistical multiplexer comprises a plurality of buffer emulators, each for emulating a corresponding buffer, and wherein the modification priority of each basic media data unit of a sequence is responsive to a simulated status of the corresponding buffer emulator.

48. The statistical multiplexer according to claim 44 wherein the statistical multiplexer is configured to receive external modification priority information, and wherein the modification priority if responsive to the external priority information.

49. The method according to claim 41, wherein the step of selecting is preceded by a step of applying at least one lossless technique for generating the multiplexed sequence such that the amount of selected basic media data unit modifications is reduced.

* * * * *